(12) United States Patent
Modi et al.

(10) Patent No.: US 9,871,754 B2
(45) Date of Patent: Jan. 16, 2018

(54) COMMUNICATING MESSAGES BETWEEN PUBLISHERS AND SUBSCRIBERS IN A MESH ROUTING NETWORK

(71) Applicants: Sohrab F. Modi, Oakland, CA (US); Kevin C. Fox, San Jose, CA (US)

(72) Inventors: Sohrab F. Modi, Oakland, CA (US); Kevin C. Fox, San Jose, CA (US)

(73) Assignees: Sohrab F. Modi, Oakland, CA (US); Kevin C. Fox, San Jose, CA (US)

( * ) Notice: Subject to any disclaimer, the term of this patent is extended or adjusted under 35 U.S.C. 154(b) by 182 days.

(21) Appl. No.: 14/798,163

(22) Filed: Jul. 13, 2015

(65) Prior Publication Data

US 2016/0021043 A1 Jan. 21, 2016

Related U.S. Application Data

(60) Provisional application No. 62/025,730, filed on Jul. 17, 2014, provisional application No. 62/025,724, (Continued)

(51) Int. Cl.
*H04L 12/58* (2006.01)
*H04L 12/721* (2013.01)
(Continued)

(52) U.S. Cl.
CPC .............. *H04L 51/14* (2013.01); *H04L 45/44* (2013.01); *H04L 49/1584* (2013.01);
(Continued)

(58) Field of Classification Search
CPC ......... G06F 17/30949; G06F 17/30952; H04L 45/44; H04L 49/1584; H04L 51/14; H04L 51/28
See application file for complete search history.

(56) References Cited

U.S. PATENT DOCUMENTS

2005/0086469 A1\* 4/2005 Dunagan ............. H04L 12/1854
713/163
2006/0233322 A1\* 10/2006 Allman ............. H04L 29/06027
379/88.01
(Continued)

*Primary Examiner* — Arvin Eskandarnia
*Assistant Examiner* — Gil H. Lee
(74) *Attorney, Agent, or Firm* — Park, Vaughan, Fleming & Dowler LLP (57) ABSTRACT

A system that communicates across a network is described. During operation, the system receives a subscription request from a subscriber requesting to subscribe to receive information published to a service name. The system applies a function to the service name to generate a value that maps to a root-node associated with the service name. The system forwards the subscription request through the network to the root-node and logs information associated with the subscription request in a subscription table at the root-node, so that the root-node can forward messages that are subsequently published to the service name to the subscriber. Upon receiving a publication request from a publisher requesting to publish a message to the service name, the system first determines the root-node from the service name. The system forwards the publication request to the root-node to be forwarded to one or more subscribers for the service name.

19 Claims, 6 Drawing Sheets

Related U.S. Application Data filed on Jul. 17, 2014, provisional application No. 62/038,949, filed on Aug. 19, 2014.

(51) Int. Cl.
*H04L 12/933* (2013.01)
*G06F 17/30* (2006.01)

(52) U.S. Cl.
CPC ........ *H04L 51/28* (2013.01); *G06F 17/30949* (2013.01); *G06F 17/30952* (2013.01)

(56) References Cited

U.S. PATENT DOCUMENTS

| | | | |
|---|---|---|---|
| 2007/0201382 A1* | 8/2007 | Ekl | H04W 84/20 370/254 |
| 2011/0292804 A1* | 12/2011 | Dempo | H04L 45/00 370/236 |
| 2011/0307603 A1* | 12/2011 | Ishikawa | G06Q 30/02 709/224 |
| 2013/0198308 A1* | 8/2013 | Yang | H04L 12/5855 709/206 |

* cited by examiner

COMMUNICATING MESSAGES BETWEEN PUBLISHERS AND SUBSCRIBERS IN A MESH ROUTING NETWORK

CROSS-REFERENCE TO RELATED APPLICATIONS

This application claims priority under 35 U.S.C. §119(e) to U.S. Provisional Application Ser. No. 62/025,724, entitled "Service Rendezvous in a Distributed Peer-to-Peer Fabric," by Sohrab F. Modi and Kevin C. Fox, filed on Jul. 17, 2014, the contents of which is incorporated by reference. This application also claims priority under 35 U.S.C. §119(e) to U.S. Provisional Application Ser. No. 62/025,730, entitled "Cascading Delivery of Publish Subscribe Messages and Subscription Partitioning in a Mesh Routing Network," by Sohrab F. Modi and Kevin C. Fox, filed on Jul. 17, 2014, the contents of which is incorporated by reference. This application additionally claims priority under 35 U.S.C. §119(e) to U.S. Provisional Application Ser. No. 62/038,949, entitled "Defining a Peer Fabric Service's Framework," by Sohrab F. Modi and Kevin C. Fox, filed on Aug. 19, 2014, the contents of which is incorporated by reference.

BACKGROUND

Field

The disclosed embodiments generally relate techniques for communicating across a network. More specifically, the disclosed embodiments relate to the design of a routing network comprised of nodes that collectively operate to communicate messages between publishers and subscribers through specific rendezvous points in the network.

Related Art

In today's digital world consumers and producers exchange information through services. The network is the conduit that enables this exchange. In a simplistic model, the client (consumer), has traditionally been a personal computer and the service (producer) has generally been an application on a server, running in what we normally refer to as a client server model.

The service is the center of attention in the new Internet. A service in our new world is not only defined to be executing under the traditional client-server model but is also redefined to operate under a connectionless, location independent peer-to-peer model. This is especially true as we progress into the era of Machine-2-Machine (M2M) and the Internet of Things (IoT).

Hence, what is needed is a mechanism for executing a service under a connectionless, local-independent peer-to-peer model.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

This new Internet evolution is aimed at representing abstractions and primitives to a service and for a service. The two primitives that the service relies on are publishers and subscribers.

Figure 1:
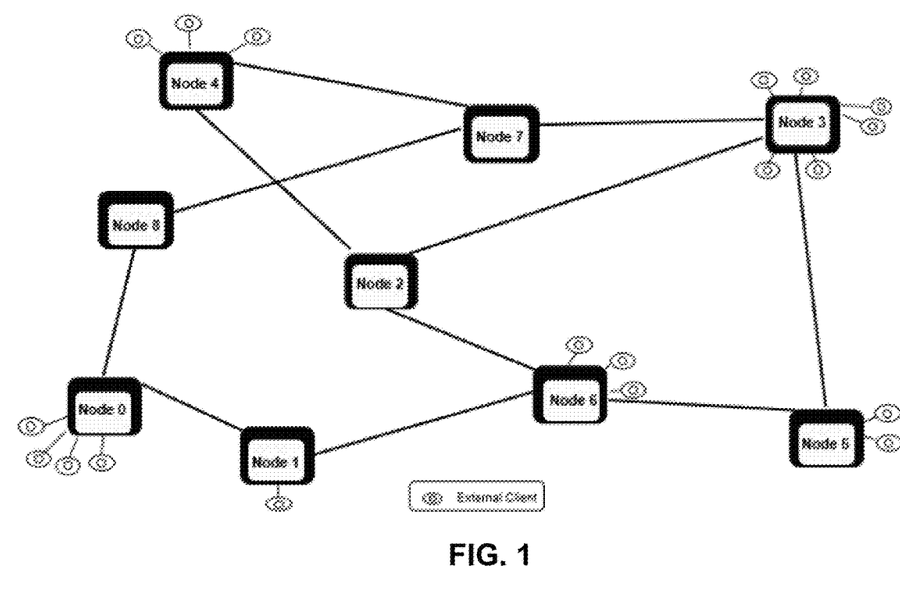
FIG. 1 illustrates a mesh network in accordance with disclosed embodiments.
Figure 2:
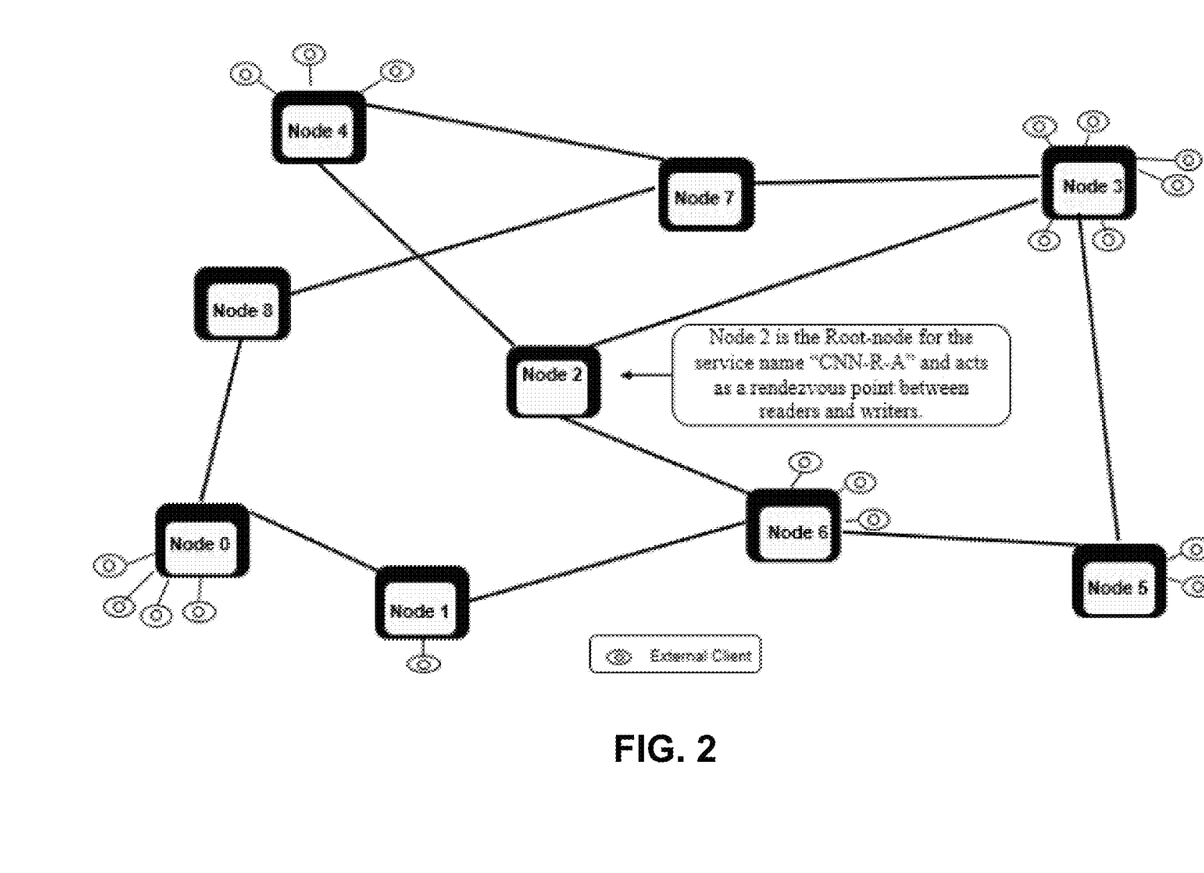
FIG. 2 illustrates a root node for a service in accordance with disclosed embodiments.

The general concept involves a number of nodes collectively coming together to form a mesh, wherein members of the mesh can coordinate their storage and memory with each other. These nodes are full members of the mesh and are peers (and clients) of the mesh and are capable of forwarding information between themselves or as a rendezvous point for a service. In one implementation of this model, such nodes (full members of the mesh) can also serve as "attach points" (shown in FIG. 1) to which an external client (a non-participating member of the mesh) can insert itself to participate in the mesh network in a limited form.

These nodes which act as "attach points" through which an external client participates in the mesh network, can now proxy requests on the behalf of such external clients into the mesh network. This mechanism allows for a mechanism by which external clients can participate in the mesh, without the overhead of being full members (nodes) of the mesh network.

Once a connection interface (ex: Websocket interface) is opened from an external client to an attach point (node), the connection acts as a conduit through which one or more clients can access the services provided by the mesh network. Such clients can then read (Subscribe) and write (Publish) to a service from the mesh network even at Internet scale. Though agnostic to the connection setup between the clients and its attach points, some implementations may use Websockets to enable asynchronous communications.

The nodes in the mesh that act as attach points can allow for one or more external clients to attach to it. Such nodes will manage the routing of messages to multiple external clients that are "attached to it" (in FIG. 1 node 0 is the attach point for 4 external clients, node 4 is the attach point for 3 external clients, and so on). Furthermore, external clients can also be members of more than one mesh network.

Details

A peer fabric service is a dynamically created redundant, "rendezvous" point in the mesh for a uniquely identified service name. Publishers and subscribers to a service through this rendezvous point can exchange information.

A node: is a participating member of the mesh. (Note that a node has a unique hash identity that it provides in its subscription requests.)

A client: can either be a "node" in the mesh or attached to a node in the mesh as an external client, but is uniquely identifiable by its hash identity. A client can be (but is not restricted to) either being a subscriber or a publisher of messages in the mesh.

Attach point: An attach point is simply a node that one or more clients can attach to. Any node in the mesh is capable of acting as an attach point and being a proxy for that client into the mesh.

Rendezvous point: is a unique node within the mesh that will act as the default location for a given "unique" service name. If this node were to fail, then a secondary neighbor node is elected to be the default location for that unique service name.

A credible entity: is either a node or a client that has the appropriate credentials to the actions being performed.

Information: defined here is data, computing capability, network capability, storage capability, database capability, or even executable code) that providers and subscribers exchange through the mesh network.

In one implementation, we define a network service framework and the discovery of the service name and the mechanisms of optimizing service paths in the mesh network.

Service Definition

Our traditional understanding of a network service (framework) is "capabilities" provided by an application, or set of applications. It is generally deemed that the network service is physically executing on a machine or a set of machines in nomenclature generally referred to as a server. Capabilities are generally functions exposed by that service, for example content, computing or computed results, database operations, network functions, etc. These functions, which are exposed by the network service, are then accessed by one or more clients.

In our implementation, one definition of a service (framework) is simply a service name descriptor (object) that is used to define a rendezvous point in the network to exchange information between one or more publishers, to one or more subscribers of the information. This service name descriptor object is "owned" by the root-node for a service and is dynamically selected in the network. The framework that provides this distribution and ownership of objects and location of root-nodes within the mesh is from Tapestry (1) but could be based on any DHT routing model.

Establishing the Rendezvous Point (the Root-Node) for a Service

This implementation utilizes the root-node that owns an object as a point of collaboration (rendezvous point) between interested parties. Neither party needs to know, nor be aware of the location of a service. Services, root-nodes and clients are all referenced and addressed as objects within the mesh, all being routed using the same DHT (Distributed Hash Table) mechanism. Since clients and services can migrate to different locations and root-nodes can migrate and exchange responsibilities with secondary root-nodes, communication channels between clients and services can continue to function without external or centralized coordination between them.

The root-node for a service serves as the Rendezvous point for all publishers and subscribers in the mesh of a particular service. Service names can either be created dynamically, or can be a previously agreed convention between publishers and subscribers. In one implementation, service names are converted into a common format, by creating a 256 bit cryptographic hash of the service name. This 256 bit hash is owned by the address of the root-node for that service and acts as the key for lookups into the mesh.

With this common key, publishers and subscribers of messages rendezvous at the same root-node, and it's this root-node that provides the message channel between publishers and their registered subscribers by forwarding published messages to the ID of all its subscribers. Rendezvous points are replicated so that the "current" root nodes may leave the mesh invoking one or more replicas to negotiate taking over ownership. The old root node can later rejoin and become a new replica or become a "root-node" to the service.

Enabling Readers and Writers for a Service

Clients of a service can be either subscribers or publishers for a service. The information identifying subscribers is maintained by the root-node. When the client in the mechanism registers as a subscriber for a particular service, it first performs a cryptographic hash on the service name. A client can either be an external client to the mesh, or a "node" (participating member of the mesh), either the external client or the node are capable of performing the service name lookup.

The cryptographic hash returns a key, which in one implementation is a 256 bit cryptographic hash ID. This key is used as the address for either publications or subscriptions to that particular service. The subscriber then sends a subscription message with its client id, a time to live (TTL) and any associative mesh credentials to the root-node. Upon receiving this subscription message, the root-node will log this information for that service in a subscription table, using the client is as the delivery address for any stored, or subsequently published messages.

Figure 3:
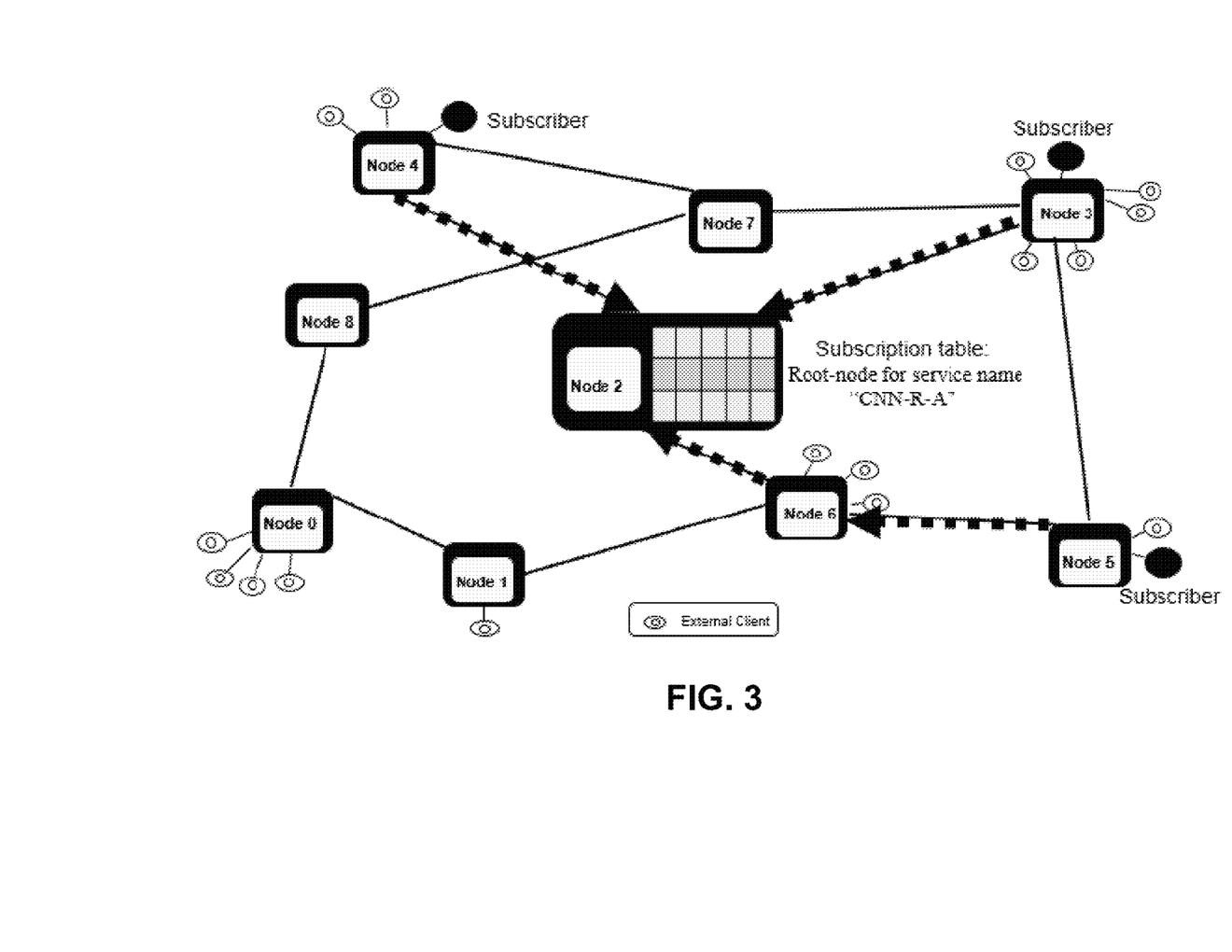
FIG. 3 illustrates subscribers and a subscription table in accordance with disclosed embodiments.

Note that FIG. 3 illustrates nodes 3, 4 and 5 that are subscribers to a service "CNN-R-A." Node 2 is the root-node for that service. The 3 nodes have registered their subscription shown through the thick arrow lines in the picture. Also note that since node 5 does not have a direct route to the root-node (node 2), it must go through an intermediate node (node 6) to reach its destination.

As shown in FIG. 3: An "external client" attached to node 5 wishes to "subscribe to the service CNN-R-A." The external client performs a cryptographic hash of the service name sends a subscription message to its "attach" point shown as node 5. Using the mechanisms provided in a DHT like Tapestry[1], node 5 forwards the message in the direction of the root node for service CNN-R-A which in this case is node 6. Node 6 in turn forwards the message to the root node 2. Now node 5 is logged as a subscriber to the service in the subscription table. Any publish messages for this service will now be sent to node 5 which can proxy message to its external client subscribers without requiring them to become full participants in the mesh.

When a client acts as a publisher to the service, it does a lookup of the root-node for that service by performing a cryptographic hash of the service name. The publisher then sends a message to the service with appropriate credential information, which is forwarded to its neighbor in the direction of the "root-node" for that service, as defined by a DHT such as Tapestry. The neighbors then forward to their neighbor till the message reaches the root node for that service.

Figure 4:
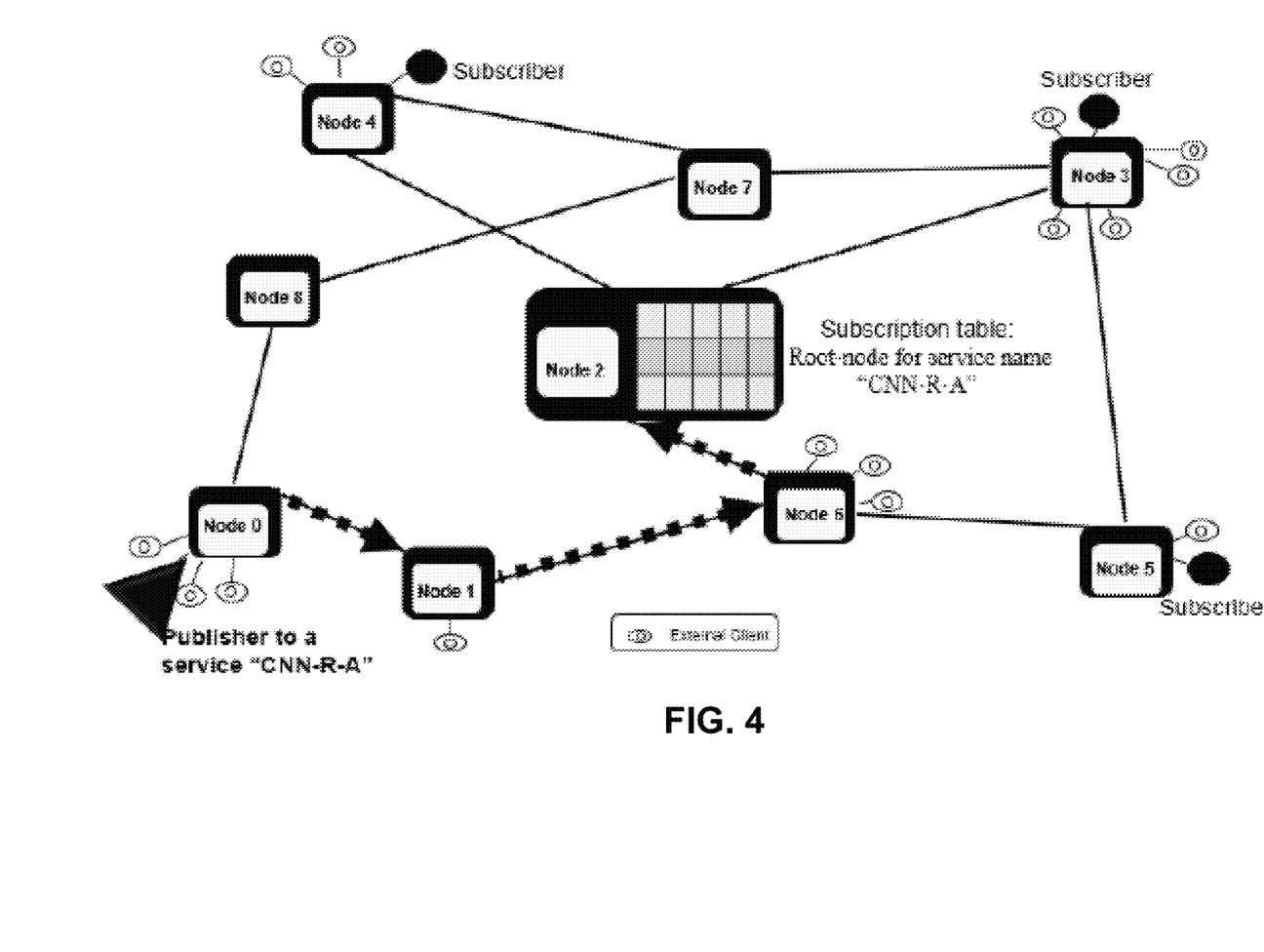
FIG. 4 illustrates publishing a message for a service in accordance with disclosed embodiments.

This is shown in FIG. 4, where a "credible external client" to the mesh wishing to publish a message to a service (shown in FIG. 4 as CNN-R-A), sends the message to its attach node (shown in FIG. 4 as node 0). The attach node will forwarded the publication message to its neighbor in the direction of the "root-node" for that service (shown in FIG. 3 as node 1). The neighbors then forward to their neighbor till the message reaches the root-node (shown in FIG. 4 as node 6).

In FIG. 4, node 0 is publishing a message for service "CNN-R-A." node 0 sends this publication to the root node (node 2) for service "CNN-R-A." The path of the message goes from node 0 to node 1 to node 6 to node 2.

When any information from the publisher is sent to the root-node for that service, the root node then matches for the "credible subscribers" of that information through its subscription table. The information is then forwarded to those subscribers by the root-node. The message is sent back to subscribers from the root-node (shown in FIG. 5: the message will be forwarded to node 5 through node 6).

Figure 5:
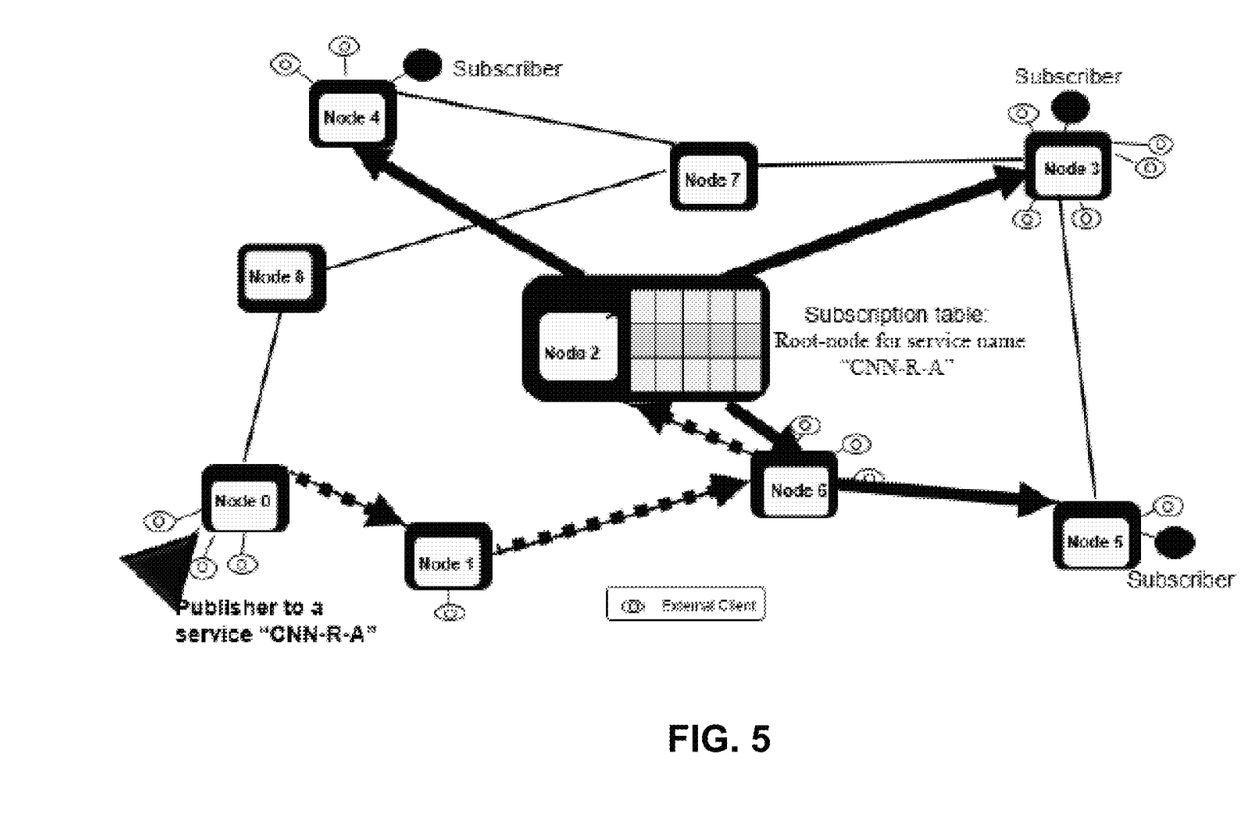
FIG. 5 illustrates distributing a message to subscribers in accordance with the disclosed embodiments.
Figure 6:
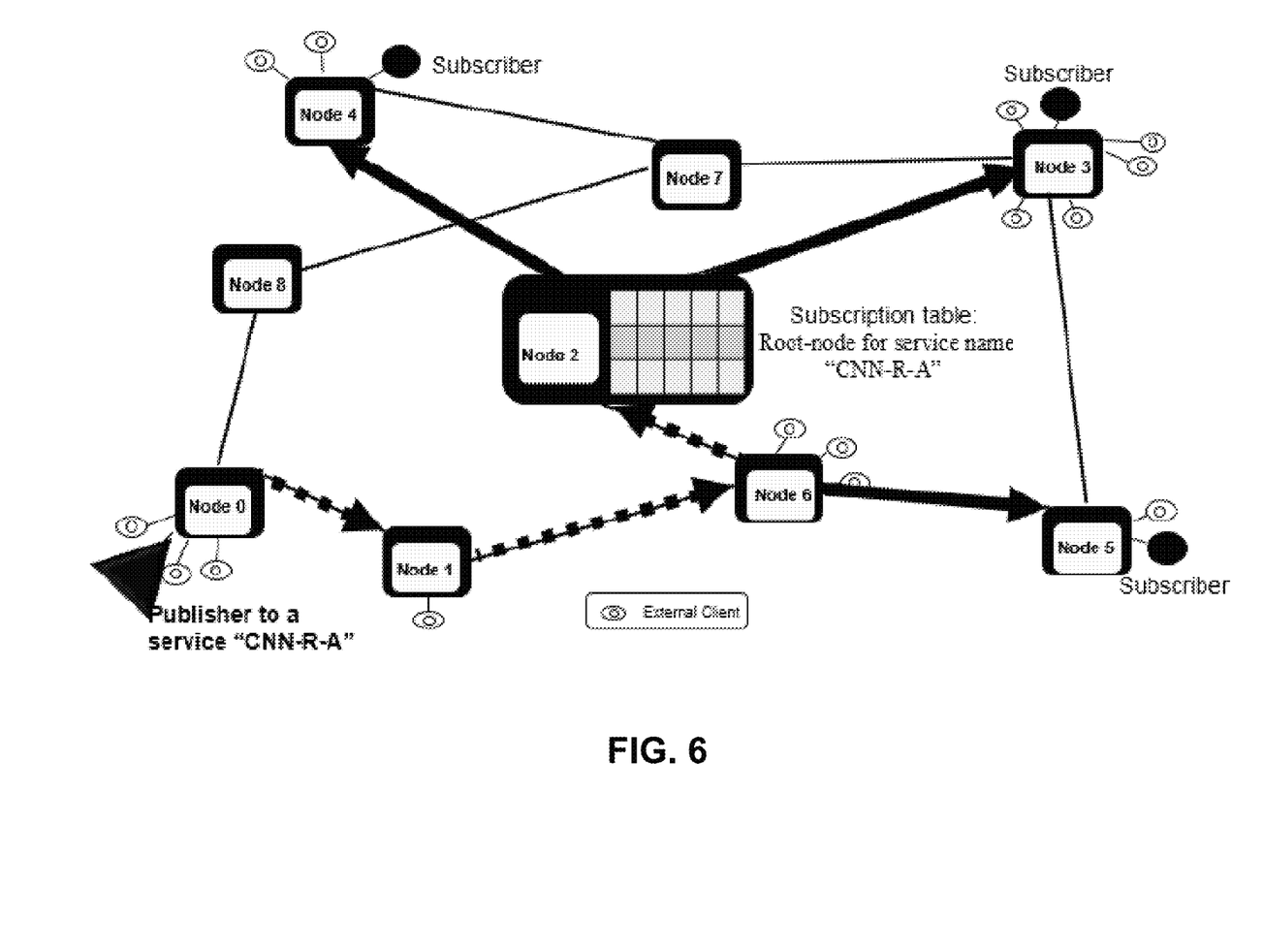
FIG. 6 illustrates propagation of a publication message in accordance with the disclosed embodiments.

In FIG. 5, node 2 (root node for the service) is distributing the message to the subscribers listed in the subscription table (nodes 3,4,5) the published message from node 0. In FIG. 6, the publication message from node 0, reaches node 6 on its way to node 2 (root node for service "CNN-R_A"). Node 6 forwards the message onto the root node, but also forwards the message to node 5 (shown by dotted lines).

Availability of the Root-Node

The root-node is the current owner of that particular service in the mesh, within a quorum set of nodes, for a specific ID. When a root-node fails or leaves the mesh, one of the other quorum members is elected as the new owner and a new replacement quorum member is recruited. When new nodes join the mesh, they become new members in the locale of the root-node that owns their node ID and negotiate partitioning the ID namespace with their root-node becoming a new root-node for their partition of the namespace along with its quorum of secondary nodes.

Information Exchange

Information exchanged through the service object can be anything (data, computing capability, network capability, storage capability, database capability, . . . or even executable code) that providers and subscribers exchange through the mesh network. Under this definition, there is no concept of client and server as in the traditional sense; simply put, publishers will write information and subscribers will read information to and from the service name (object). For example a subscriber end point can also be a provider end point and vice versa.

This dynamic service enablement, takes away all the complexities of creating a traditional service and connecting clients to it. Furthermore, unlike a traditional service there is no requirement that a subscriber for a service must exist before someone can write to the service. In this case the writer to a service can simply write to the service, with nowhere to go with respect to the end delivery of the information. When a subscriber for that particular service appears, the information would be made available. This creates the truly intelligent network. The information can be time bound to optimize for storage considerations.

You can now have multiple receivers or multiple senders that are now equivalently multicasting between each other (for reading and writing) as in the case of IP multicast.

An example of this would allow you to create dynamic VPNs on the fly (by providing the appropriate ACLs and encryption), with little or no overhead.

Service Names

The service name can be private (which in itself is a form of loose security) or public, where the name is "discoverable" (so others can attach to it). All of this will be controlled through access control lists and service directories.

To enable service management, a service directory can be provided. A service directory allows for authenticated users to manage service framework names (objects). Service framework names can be created, managed, and deleted through the use of interfaces (via API or other) and rules.

Service (framework) names are unique, and a request to create another exact service framework name may result in an error. We also propose that each service name has a description associated with that name to distinguish between different services to establish context for that name. Such a descriptive context to the service name will allow for the service names to be queried, not only by the "service name" itself but also through its descriptive context using context aware searches.

The service directory will be associated to user identities through the use of authentication. Creators of the service objects can then provide access control lists to allow other users of those services (readers or writers) to access that service object.

The service now can have (at least) one writer, one reader or multiple writers to the service. A single writer means that explicitly one identified client can write to the service, but multiple clients can read from that service (ex: CNN can be a writer of news to multiple subscribers). A single reader means that only a single identified client can read from that service, but multiple clients can read from that service all other clients are readers of the service (ex: user input queue). Finally multiple identified readers and writers, would be equivalent to group multicast service. This capability is set up through the use security mechanism like Access Control Lists (ACL) to "identify" client access to the service.

Use Cases

Though, one implementation of such a framework allows for a newly expanded definition of a service, it can also be specifically applied to enable the "dynamic" discovery of real-time searches without the use analytics. This is done by simply defining the searchable phrase as a service and subscribing to it. Publishers would then publish their content using the service name as the phrase to be searched.

Another specific implementation of such a framework is in the creation of "dynamic" conferencing (audio/video), capabilities. Here multiple external clients could video conference by simply using a "service name" as a way to collaborate.

Service Network Path Optimizations

When a client acts as a subscriber or publisher of information, the message is forwarded to its neighbor towards the direction the "root-node" for that service. The neighbors then forward to their neighbor till the message reaches the root node.

In the Non-Optimized Case

The information identifying publishers and subscribers is maintained only by the root-node. When the client in the mechanism registers as a subscriber for a particular service, it sends a subscription message with its client id and any associative mesh credentials. These are maintained by the root-node for that service in a "subscription table."

The root-node will now forward that message to the list of all its subscribers that have the credentials to receive the message. The message is sent back to each subscriber client-id directly from the root node.

Two advantages of such a mechanism are that: (1) a message could be directed to multiple endpoints; and (2) the vast list of different services get distributed and maintained by different "root-nodes" in a consistent way, thereby reducing the overhead of processing the lookup from a single root-node for all services.

A disadvantage of such a mechanism is that the list of all publishers and subscribers of a particular service is maintained by the root-node for that service. If the number of publishers and subscribes for a service gets too large, the performance of the system will degrade drastically, especially if the "chatter" on that service gets excessive. To overcome this we are suggesting two forms of subscription optimization. We also suggest an optimization for publication delivery.

Optimization 1

As before each service has a "root-node" that will be the final arbitrator for that service. In this implementation, when a client subscribes to a particular service, nodes within the path of the subscription message heading to the root-node will cache the request for the subscription and send their own ID as a subscription for themselves.

Each intermediary node along the path now becomes a "proxy-root-node" for that subscription and maintains a list of received ID subscriptions to forward publications that are sent to it. These proxy requests continue until the root-node is reached, then that subscription registration stands ready at the root-node until a matching publish message arrives.

Now the "root-node" only needs to maintain only a list of first hop neighbors to forward the subscription to. In turn each subsequent hop will also "only" maintain the list of next hops to forward the publication to and so on till the message is delivered to all of its subscribers.

As in the non-optimized case, when a client publishes on a service, the message is directed towards the root node. In this optimized case the message gets to subscribers in two ways:

(1) No "proxy-root-node" in the path of the publish message to the root node: In this case, the publish message doesn't transect any proxy nodes on its way to the root node. Once it arrives, as in the non-optimized case, the message is sent by the root node to its list of subscribers. However the list of subscribers is only a list of first hop subscribers, who in turn will look up and forward to their next hop along the subscription chain and so on till the subscribing client is reached.

(2) A "proxy-root-node" exists in the path of the publish message to the root node: In this case, the publish message encounters a proxy node on its way to the root node. Here publication message is immediately forwarded to subscribers that are found in proxy-root-node subscription tables along the path to the root-node, when the publish message arrives at the root-node it then forwards those messages to all subscribers except the one it received the publication from. This results in the incoming publications being passed along sooner to subscribers that are closer to the publisher and allows the root-node to assume that publications have already been sent along the path of the node it received the message from.

Pros: In this case we now avoid the case where a root node needs to maintain a very large list of subscribers in its "subscription table".

Cons: (1) In this case every node along the path to the destination will maintain its set of forwarding nodes as well and will do a lookup in its own subscription table for every message on the relevant topic. While this optimization works in many cases, it is entirely feasible that at least one of the nodes could be a bottleneck for the entire messaging stream for various performance related reasons (oversubscribed, low CPU, slow network io, . . . ). (2) Many proxy node chains could be related only to just a single subscription, thus making the subscription chain sub-optimal unless there are more subscriptions added to the change to offset the cost. For this reason we have also suggested an alternative optimization scheme as optimization #2.

Optimization 2

In another implementation, intermediary nodes in the lookup path do not subscribe themselves (as in optimization 1) but pass the subscribers ID along to the root-node. The root-node can make decisions about partitioning its table and sending out those partitions to be proxied by specific neighbor nodes. Elected neighbors which own partitions can accept subscriptions and add them to their table rather than forwarding them to the root node, and also judge when their tables become large enough that they must be partitioned and passed onto specific neighbor nodes, and so on. This optimizes the number of forwarding proxy nodes and their table sizes. In some implementations, nodes can maintain multiple table partition objects.

Pros: (1) In this case we only create proxy subscribers when the expense is justified. (2) When un-subscriptions reduce table size sufficiently on a particular node it can reassign its responsibilities back and keep the subscription tables optimized.

Cons: (1) There may be service interruption when tables are partitioned and reassigned, but it only impacts a specific branch of subscribers.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for communicating across a mesh network, comprising:
receiving a subscription request from a subscriber requesting to subscribe to receive information published to a service name, wherein the subscription request is received from an external client that is a non-participating member of the mesh network through an attach point, wherein the attach point is a node in the mesh network that external clients attach to, and that proxies requests on behalf of attached external clients, and wherein the service name is dynamically selected;
applying a function to the service name to generate a value that maps to a root-node that serves as a rendezvous point for the service name, wherein the rendezvous point is dynamic and changes over time, and wherein the rendezvous point is a member of a plurality of rendezvous points for the service name;

forwarding the subscription request through the mesh network to the root-node;

logging information associated with the subscription request in a subscription table at the root-node, thereby enabling the root-node to forward messages that are subsequently published to the service name to the subscriber;

creating a replica root-node that is capable of serving as the rendezvous point for the service name, wherein the root-node leaves the mesh network invoking the replica root-node to take over ownership as the rendezvous point for the service name; and assigning the root-node that left the mesh network as a new replica root-node for the service name upon rejoining the mesh network.

2. The method of claim 1, wherein the method further comprises:

receiving a publication request from a publisher requesting to publish a message to the service name;

applying the function to the service name to generate the value that maps to the root-node associated with the service name;

forwarding the publication request through the mesh network to the root-node;

using the subscription table at the root-node to match the publication request to one or more subscribers for the service name; and forwarding the message from the root-node to the one or more subscribers through the mesh network.

3. The method of claim 2, wherein the publication request is received from the external client through the attach point.

4. The method of claim 1, wherein while forwarding the subscription request through a path to the root-node, intermediary nodes along the path become proxy-root-nodes that store information on subscription requests directed to the root-node in associated proxy-root-node subscription tables;

wherein when a publication request directed to the root-node is received at a proxy-root-node, the publication request's message is immediately forwarded to associated subscribers specified in the proxy-root-node subscription table.

5. The method of claim 4, wherein subscription tables in each root-node and each proxy-root-node only include a list of first hop neighbors to forward a subscription to.

6. The method of claim 1, wherein the method further comprises, upon deciding at the root node to partition the subscription table:

generating partitions for the subscription table;

sending the partitions to specific neighboring nodes to be proxied by the specific neighboring nodes, so that the specific neighboring nodes become proxy-root-nodes with associated proxy-root-node subscription tables;

wherein when a publication request directed to the root-node is received at a proxy-root-node, the publication request's message is immediately forwarded to associated subscribers specified in the proxy-root-node subscription table.

7. The method of claim 2, wherein each subscription request includes one or more of the following:

a client identifier that identifies the associated subscriber;
a time-to-live (TTL) value that specifies a duration for the requested subscription; and credential information for the associated subscriber.

8. The method of claim 1, wherein if a publication request is received for a service name and no subscribers presently exist for the service name, an associated message in the publication request is stored, so that the associated message is sent to subsequent subscribers for the service name.

9. A non-transitory computer-readable storage medium storing instructions that when executed by a computer cause the computer to perform a method for method for communicating across a mesh network, the method comprising:

receiving a subscription request from a subscriber requesting to subscribe to receive information published to a service name, wherein the subscription request is received from an external client that is a non-participating member of the mesh network through an attach point, wherein the attach point is a node in the mesh network that external clients attach to, and that proxies requests on behalf of attached external clients, and wherein the service name is dynamically selected;

applying a function to the service name to generate a value that maps to a root-node that serves as a rendezvous point for the service name, wherein the rendezvous point is dynamic and changes over time, and wherein the rendezvous point is a member of a plurality of rendezvous points for the service name;

forwarding the subscription request through the mesh network to the root-node;

logging information associated with the subscription request in a subscription table at the root-node, thereby enabling the root-node to forward messages that are subsequently published to the service name to the subscriber;

creating a replica root-node that is capable of serving as the rendezvous point for the service name, wherein the root-node leaves the mesh network invoking the replica root-node to take over ownership as the rendezvous point for the service name; and assigning the root-node that left the mesh network as a new replica root-node for the service name upon rejoining the mesh network.

10. The non-transitory computer-readable storage medium 9, wherein the method further comprises:

receiving a publication request from a publisher requesting to publish a message to the service name;

applying the function to the service name to generate the value that maps to the root-node associated with the service name;

forwarding the publication request through the mesh network to the root-node;

using the subscription table at the root-node to match the publication request to one or more subscribers for the service name; and forwarding the message from the root-node to the one or more subscribers through the mesh network.

11. The non-transitory computer-readable storage medium of claim 10, wherein the publication request is received from the external client through the attach point.

12. The non-transitory computer-readable storage medium 9, wherein while forwarding the subscription request through a path to the root-node, intermediary nodes along the path become proxy-root-nodes that store information on subscription requests directed to the root-node in associated proxy-root-node subscription tables;

wherein when a publication request directed to the root-node is received at a proxy-root-node, the publication request's message is immediately forwarded to associated subscribers specified in the proxy-root-node subscription table.

13. The non-transitory computer-readable storage medium 9, wherein the method further comprises, upon deciding at the root node to partition the subscription table:
generating partitions for the subscription table;
sending the partitions to specific neighboring nodes to be proxied by the specific neighboring nodes, so that the specific neighboring nodes become proxy-root-nodes with associated proxy-root-node subscription tables;
wherein when a publication request directed to the root-node is received at a proxy-root-node, the publication request's message is immediately forwarded to associated subscribers specified in the proxy-root-node subscription table.

14. The non-transitory computer-readable storage medium of claim 9, wherein if a publication request is received for a service name and no subscribers presently exist for the service name, an associated message in the publication request is stored, so that the associated message is sent to subsequent subscribers for the service name.

15. A system that facilitates communicating across a mesh network, comprising:
the mesh network comprising a plurality of computing nodes; and
a communication mechanism that executes across the plurality of computing nodes, wherein during operation the communication mechanism:
receives a subscription request from a subscriber requesting to subscribe to receive information published to a service name, wherein the subscription request is received from an external client that is a non-participating member of the mesh network through an attach point, wherein the attach point is a node in the mesh network that external clients attach to, and that proxies requests on behalf of attached external clients, and wherein the service name is dynamically selected;
applies a function to the service name to generate a value that maps to a root-node that serves as a rendezvous point for the service name, wherein the rendezvous point is dynamic and changes over time, and wherein the rendezvous point is a member of a plurality of rendezvous points for the service name;
forwards the subscription request through the mesh network to the root-node;
logs information associated with the subscription request in a subscription table at the root-node, thereby enabling the root-node to forward messages that are subsequently published to the service name to the subscriber;
creates a replica root-node that is capable of serving as the rendezvous point for the service name, wherein the root-node leaves the mesh network invoking the replica root-node to take over ownership as the rendezvous point for the service name; and
assigns the root-node that left the mesh network as a new replica root-node for the service name upon rejoining the mesh network.

16. The system of claim 15, wherein during operation the communication mechanism additionally:
receives a publication request from a publisher requesting to publish a message to the service name;
applies the function to the service name to generate the value that maps to the root-node associated with the service name;
forwards the publication request through the mesh network to the root-node;
uses the subscription table at the root-node to match the publication request to one or more subscribers for the service name; and
forwards the message from the root-node to the one or more subscribers through the mesh network.

17. The system of claim 15,
wherein while forwarding the subscription request through a path to the root-node, intermediary nodes along the path become proxy-root-nodes that store information on subscription requests directed to the root-node in associated proxy-root-node subscription tables;
wherein when a publication request directed to the root-node is received at a proxy-root-node, the publication request's message is immediately forwarded to associated subscribers specified in the proxy-root-node subscription table.

18. The system of claim 15, wherein upon deciding at the root node to partition the subscription table, the communication mechanism:
generates partitions for the subscription table;
sends the partitions to specific neighboring nodes to be proxied by the specific neighboring nodes, so that the specific neighboring nodes become proxy-root-nodes with associated proxy-root-node subscription tables;
wherein when a publication request directed to the root-node is received at a proxy-root-node, the publication request's message is immediately forwarded to associated subscribers specified in the proxy-root-node subscription table.

19. The system of claim 15, wherein if a publication request is received for a service name and no subscribers presently exist for the service name, an associated message in the publication request is stored, so that the associated message is sent to subsequent subscribers for the service name.

* * * * *